US008316638B2

(12) United States Patent
Tornambe

(10) Patent No.: US 8,316,638 B2
(45) Date of Patent: Nov. 27, 2012

(54) CONTROL SYSTEM FOR A PARTICULATE MATTER FILTER

(75) Inventor: Frank Tornambe, Livonia, MI (US)

(73) Assignee: GM Global Technology Operations LLC ( * ) Notice: Subject to any disclaimer, the term of this patent is extended or adjusted under 35 U.S.C. 154(b) by 935 days.

(21) Appl. No.: 11/954,892

(22) Filed: Dec. 12, 2007

(65) Prior Publication Data
US 2009/0151337 A1 Jun. 18, 2009

(51) Int. Cl.
F01N 3/00 (2006.01)

(52) U.S. Cl. ............... 60/297; 60/285; 60/286; 60/298; 60/311; 701/110; 701/112; 123/331; 123/333

(58) Field of Classification Search ............... 60/274, 60/284–287, 299–301; 123/41.15, 198 D, 123/198 DB, 198 DC, 331, 333, 335, 676; 701/110, 112, 114
See application file for complete search history.

(56) References Cited

U.S. PATENT DOCUMENTS

| | | | | |
|---|---|---|---|---|
| 4,102,316 A * | 7/1978 | Valbert | ............ | 123/198 DB |
| 4,319,451 A * | 3/1982 | Tajima et al. | ............ | 60/274 |
| 4,330,808 A * | 5/1982 | Sawada et al. | ............ | 361/25 |
| 4,348,728 A * | 9/1982 | Sagisaka et al. | ............ | 701/107 |
| 4,698,761 A * | 10/1987 | Cooper et al. | ............ | 701/19 |
| 5,070,832 A * | 12/1991 | Hapka et al. | ............ | 123/198 D |
| 5,094,192 A * | 3/1992 | Seiffert et al. | ............ | 123/41.15 |
| 5,107,432 A * | 4/1992 | Martinelli | ............ | 701/112 |
| 5,201,284 A * | 4/1993 | Umehara | ............ | 123/41.15 |
| 5,505,752 A * | 4/1996 | Burrous et al. | ............ | 96/337 |
| 5,559,703 A * | 9/1996 | Iwata et al. | ............ | 701/86 |
| 5,797,775 A * | 8/1998 | Ozawa et al. | ............ | 440/1 |
| 5,927,248 A * | 7/1999 | Lang et al. | ............ | 123/396 |
| 6,055,470 A * | 4/2000 | Londot et al. | ............ | 701/35 |
| 6,057,605 A | 5/2000 | Bourne et al. | | |
| 6,068,528 A * | 5/2000 | Suzuki | ............ | 440/1 |
| 6,516,781 B2 * | 2/2003 | Weisman | ............ | 123/435 |
| 6,524,150 B2 * | 2/2003 | Ozawa | ............ | 440/88 L |
| 6,763,659 B2 * | 7/2004 | Watanabe et al. | ............ | 60/297 |
| 6,910,329 B2 * | 6/2005 | Bunting et al. | ............ | 60/297 |
| 6,978,602 B2 * | 12/2005 | Ohtake et al. | ............ | 60/295 |
| 7,051,517 B2 * | 5/2006 | Mehta et al. | ............ | 60/285 |
| 7,054,734 B2 * | 5/2006 | Todoroki et al. | ............ | 701/105 |
| 7,059,113 B2 * | 6/2006 | Hirota et al. | ............ | 60/277 |
| 7,065,960 B2 * | 6/2006 | Gioannini et al. | ............ | 60/295 |
| 7,159,384 B2 * | 1/2007 | Otake et al. | ............ | 60/277 |
| 7,168,244 B2 * | 1/2007 | Iizuka et al. | ............ | 60/295 |
| 7,169,364 B2 * | 1/2007 | Ohtake et al. | ............ | 422/168 |
| 7,204,235 B1 * | 4/2007 | Gebby et al. | ............ | 123/481 |
| 7,207,309 B2 * | 4/2007 | Adams et al. | ............ | 123/198 D |
| 7,216,480 B2 * | 5/2007 | Suzuki et al. | ............ | 60/285 |

(Continued)

FOREIGN PATENT DOCUMENTS

DE 69003744 T2 2/1994

(Continued)

Primary Examiner — Thomas Denion
Assistant Examiner — Jesse Bogue

(57) ABSTRACT

A method comprises determining a temperature of a particulate matter (PM) filter in communication with an exhaust gas from an engine; and reducing a power output of the engine when the PM filter is not being regenerated and the temperature exceeds a first predetermined temperature. A control module comprises a PM filter temperature determination module that determines the temperature of a PM filter in communication with an exhaust gas from an engine; and a reduced engine power module in communication with the PM filter temperature determination module that reduces the power output of the engine when the PM filter is not being regenerated and the temperature exceeds a first predetermined temperature.

18 Claims, 3 Drawing Sheets

U.S. PATENT DOCUMENTS

| | | | |
|---|---|---|---|
| 7,299,626 B2 * | 11/2007 | Barasa et al. | 60/297 |
| 7,684,924 B2 * | 3/2010 | Darr et al. | 701/112 |
| 7,694,509 B2 * | 4/2010 | Noirot et al. | 60/295 |
| 7,841,170 B2 * | 11/2010 | Collins et al. | 60/295 |
| 2005/0247052 A1 * | 11/2005 | Kobayashi et al. | 60/297 |
| 2007/0000238 A1 * | 1/2007 | Marlett et al. | 60/286 |
| 2007/0214774 A1 * | 9/2007 | Higuchi | 60/285 |

FOREIGN PATENT DOCUMENTS

| | | |
|---|---|---|
| EP | 0402773 A1 | 12/1990 |
| FR | 2829526 * | 3/2003 |

* cited by examiner

US 8,316,638 B2

CONTROL SYSTEM FOR A PARTICULATE MATTER FILTER

FIELD

The present disclosure relates to particulate matter (PM) filters, and more specifically, to systems and methods for limiting a temperature of a PM filter.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy.

The increased temperature of the PM filter during regeneration may exceed the temperature at which the collected PM combusts without exceeding the temperature at which the PM may be damaged. For example, PM from a diesel engine may combust at temperatures of 550 degrees Celsius (° C.) or above while a PM filter such as one employed in a full-size pickup truck may be damaged at temperatures as low as 800° C.

High PM filter temperatures may also occur in situations other than regeneration. Fault conditions may exist such that the PM filter temperature unintentionally rises during vehicle operation to a level that may damage the PM filter if continued for a period of time. Examples of other fault conditions that may occur in a diesel vehicle include an exhaust gas recirculation (EGR) valve leaking or sticking open, or leaks in the EGR gasket, turbocharger, intake manifold gasket, fuel injectors, charge air cooler (CAC), CAC pipes, or CAC hoses. In general, the PM filter temperature may rise to a potentially damaging level during any underboost or overfueling condition that results in abnormally high exhaust gas temperatures.

SUMMARY

A method comprises determining a temperature of a particulate matter (PM) filter in communication with an exhaust gas from an engine; and reducing a power output of the engine when the PM filter is not being regenerated and the temperature exceeds a first predetermined temperature.

A control module comprises a PM filter temperature determination module that determines the temperature of a PM filter in communication with an exhaust gas from an engine; and a reduced engine power module in communication with the PM filter temperature determination module that reduces the power output of the engine when the PM filter is not being regenerated and the temperature exceeds a first predetermined temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present teachings will become more fully understood from the detailed description and the accompanying drawings, wherein.

DETAILED DESCRIPTION

Figure 1:
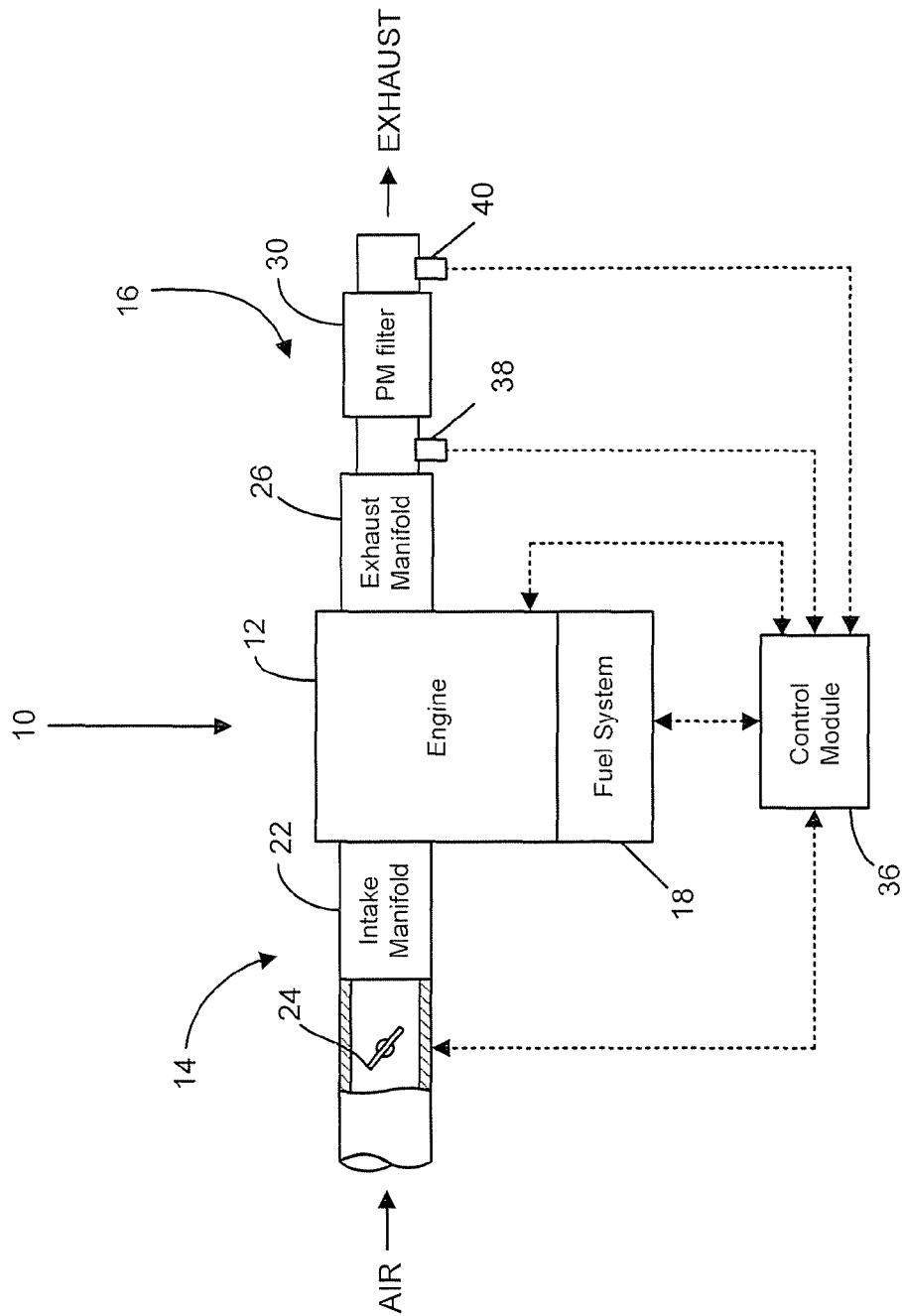
FIG. 1 is a schematic illustration of an exemplary vehicle.

The following description is merely exemplary in nature and is in no way intended to limit the present teachings, applications, or uses. For purposes of clarity, the same reference numbers will be used in the drawings to identify similar elements. As used herein, the term module refers to an application specific integrated circuit (ASIC), an electronic circuit, a processor (shared, dedicated or group) and memory that execute one or more software or firmware programs, a combinational logic circuit, or other suitable components that proved the described functionality.

Referring now to FIG. 1, an exemplary vehicle 10 is schematically illustrated. Vehicle 10 may include engine 12 in communication with intake system 14, exhaust system 16, fuel system 18, and control module 36. Intake system 14 may include intake manifold 22 and throttle 24. Exhaust system 16 may include exhaust manifold 26 in communication with PM filter 30, as well as one or more PM filter temperature sensors such as PM filter inlet sensor 38 and PM filter outlet sensor 40. Control module 36 may be in communication with engine 12, fuel system 18, throttle 24, PM filter inlet sensor 38 and PM filter outlet sensor 40.

For purposes of illustration, vehicle 10 will be described as having a diesel engine 12. Although vehicle 10 is disclosed with a diesel engine 12, it should be understood that the present disclosure applies to other types of engines in vehicles 10 that include a PM filter 30.

Throttle 24 may control air flow into diesel engine 12 and fuel system 18 may control a fuel flow into diesel engine 12. Exhaust gas created by combustion of the air/fuel mixture may exit diesel engine 12 through exhaust system 16. PM filter inlet sensor 38 and PM filter outlet sensor 40 may provide signals to control module 36 indicative of the temperature of the exhaust gas at the inlet and outlet of the PM filter 30.

Figure 2:
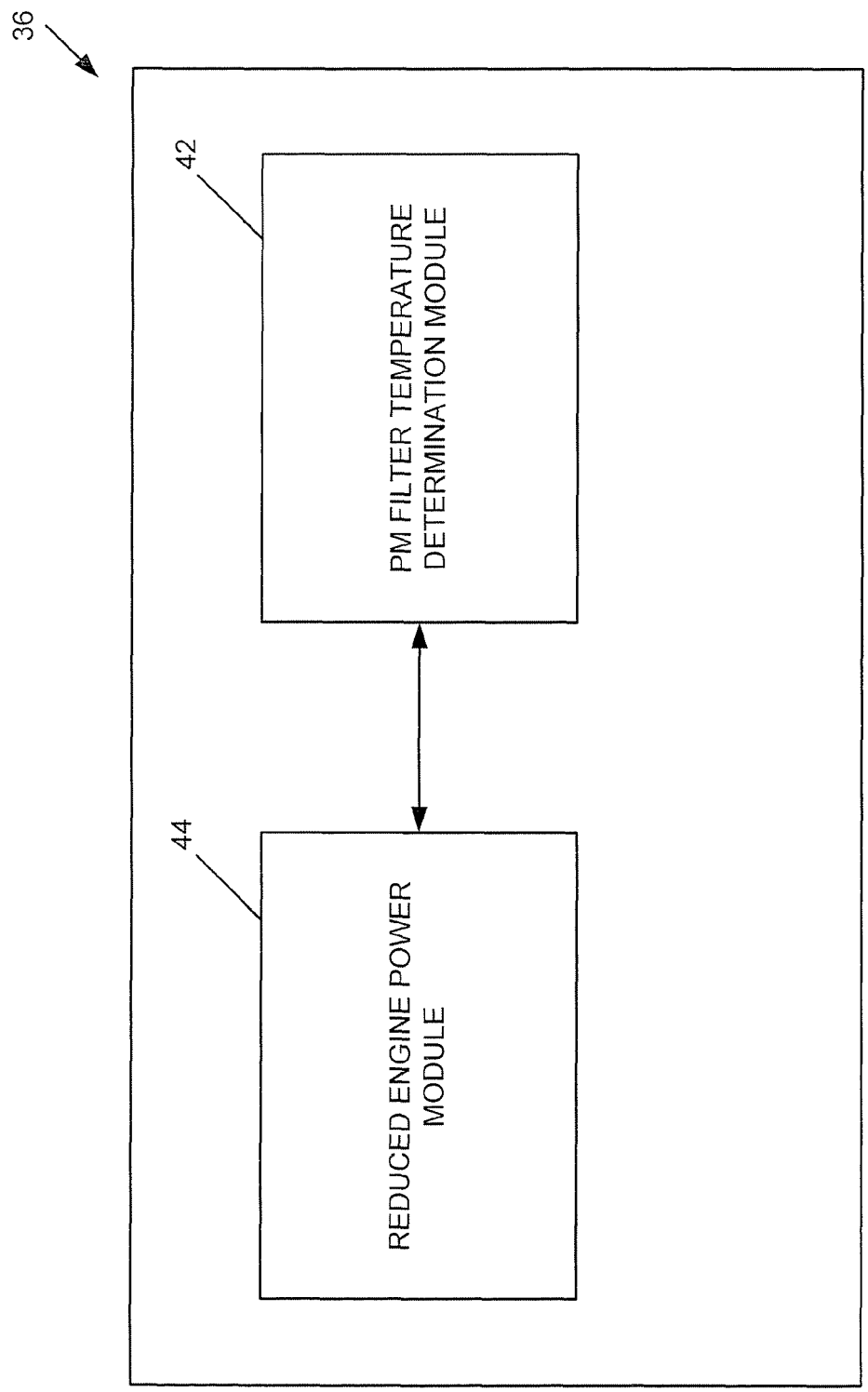
FIG. 2 is a block diagram of a control module of a vehicle.

Referring to FIG. 2, a block diagram of control module 36 is depicted. Control module 36 may include PM filter temperature determination module 42 and reduced engine power module 44. PM filter temperature determination module 42 may be in communication with reduced engine power module 44 and may receive information from the PM filter inlet sensor 38 and/or PM filter outlet sensor 40, as discussed below. Reduced engine power module 44 may be in communication with throttle 24 and fuel system 18 to control the power of diesel engine 12.

Figure 3:
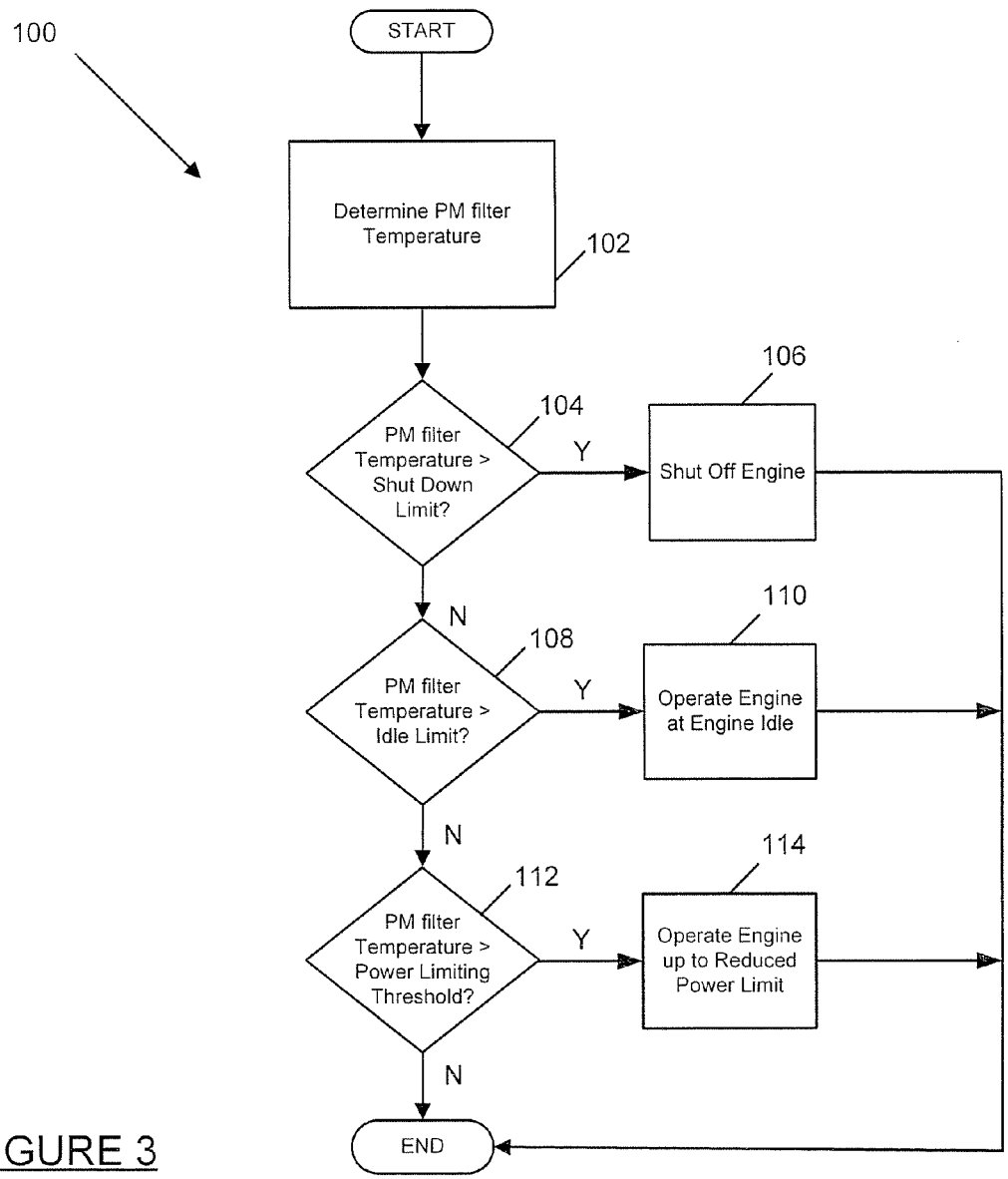
FIG. 3 is a flow diagram describing steps in control system for a PM filter.

Referring to FIG. 3, a flow diagram of steps in a control system for a PM filter is depicted in control logic 100. At block 102, PM filter temperature determination module 42 may monitor PM filter inlet sensor 38 and/or PM filter outlet sensor 40 to determine a PM filter 30 temperature. Control logic 100 may then continue to block 104.

At block 104, reduced engine power module 44 may use the PM filter 30 temperature determined from PM filter temperature determination module 42 at block 102 to analyze whether the PM filter 30 temperature is at a level that requires corrective action. More specifically, block 104 may compare the determined PM filter temperature to a temperature value that operates as a shut down limit. The value of the shut down limit may be a temperature at which continued diesel engine 12 operation at any power level may produce an exhaust gas that results in damage to PM filter 30, such as a temperature approaching 800° C. for an exemplary full-size pickup.

If the determined PM filter 30 temperature exceeds the shut down limit, control logic 100 may continue to block 106. At block 106, reduced engine power module 44 may gradually shut down diesel engine 12 by gradually ceasing to supply fuel and air from fuel system 18 or intake system 14 to diesel engine 12. Before shut down occurs, a chime, message or other indication may be provided to the driver to indicate that a gradual shut down will be occurring. If the determined PM filter 30 temperature does not exceed the shut down limit, control logic 100 may continue to block 108.

At block 108, reduced engine power module 44 may use the PM filter 30 temperature determined from PM filter temperature determination module 42 at block 102 to analyze whether the PM filter temperature is at a level such that vehicle 10 may continue to operate but only at an idle speed. More specifically, block 108 may compare the determined PM filter 30 temperature to a temperature value that operates as an idle limit. The value of the idle limit may be a temperature at which continued operation of diesel engine 12 at an engine speed greater than an idle may continue to increase an exhaust temperature to a level that may contribute to damage to PM filter 30. In an exemplary full-size pickup, the idle limit may be approximately 750° C.

If the determined PM filter 30 temperature exceeds the idle limit, control logic 100 may continue to block 110. At block 110, reduced engine power module 44 may force diesel engine 12 to operate at an idle speed by controlling intake system 14 and fuel system 18 to provide air and fuel sufficient to operate diesel engine 12 at an idle speed. If the determined PM filter 30 temperature does not exceed the idle limit, control logic 100 may continue to block 112.

At block 112, reduced engine power module 44 may use the PM filter 30 temperature determined from PM filter temperature determination module 42 at block 102 to analyze whether the PM filter 30 temperature is at a level such that the vehicle may continue to operate up to a reduced power limit. More specifically, block 112 may compare the determined PM filter 30 temperature to a temperature value that operates as a power limiting threshold. The value of the power limiting threshold may be a temperature at which diesel engine 12 may continue to operate at a power requested by the operator up to a reduced power limit below which normal vehicle operation should not create exhaust that damages PM filter 30. In an exemplary full-size pickup the power limiting threshold may be 700° C.

If the determined PM filter 30 temperature exceeds the power limiting threshold, control logic 100 may continue to block 114. At block 114, reduced engine power module 44 may limit the power of diesel engine 12 by controlling intake system 14 and fuel system 18 to provide air and fuel as needed to operate diesel engine 12 up to a reduced power limit at which further air and fuel will not be supplied to diesel engine 12. If the determined PM filter 30 temperature does not exceed the power limiting threshold, control logic 100 may then be ended.

Those skilled in the art may now appreciate from the foregoing that the broad teachings of the present disclosure may be implemented in a variety of forms. Therefore, while this disclosure has been described in connection with particular examples thereof, the true scope of the disclosure should no be so limited since other modifications will become apparent to the skilled practitioner upon a study of the drawings, the specification and the following claims.

What is claimed is:

1. A method, comprising:
   determining a temperature of a particulate matter (PM) filter disposed downstream from an engine without a catalytic oxidizer disposed in the PM filter or between the engine and the PM filter; and
   starting to reduce a power output of the engine when the temperature of the PM filter exceeds a first predetermined temperature while the PM filter is not being actively regenerated.

2. The method of claim 1, wherein the determining includes measuring an inlet temperature at an inlet of the PM filter.

3. The method of claim 1, wherein the determining includes measuring an outlet temperature at an outlet of the PM filter.

4. The method of claim 1, wherein the reducing includes limiting fuel supplied to the engine.

5. The method of claim 4, further comprising reducing an engine speed to an idle speed when the temperature of the PM filter exceeds a second predetermined temperature greater than the first predetermined temperature.

6. The method of claim 5, further comprising gradually shutting down the engine when the temperature of the PM filter exceeds a third predetermined temperature greater than the second predetermined temperature.

7. The method of claim 4, further comprising gradually shutting off power to the engine when the temperature of the PM filter exceeds a second predetermined temperature greater than the first predetermined temperature.

8. The method of claim 1, wherein the reducing includes limiting an engine speed to an idle speed.

9. The method of claim 1, wherein the reducing includes gradually shutting off power to the engine.

10. A control module, comprising:
    a PM filter temperature determination module that determines a temperature of a PM filter disposed downstream from an engine without a catalytic oxidizer disposed in the PM filter or between the engine and the PM filter; and
    a reduced engine power module in communication with the PM filter temperature determination module that starts to reduce a power output of the engine when the temperature of the PM filter exceeds a first predetermined temperature while the PM filter is not being actively regenerated.

11. The control module of claim 10, wherein the PM filter temperature determination module is in communication with a temperature sensor at an inlet of the PM filter that measures an inlet temperature.

12. The control module of claim 10, wherein the PM filter temperature determination module is in communication with a temperature sensor at an outlet of the PM filter that measures an outlet temperature.

13. The control module of claim 10, wherein the reduced engine power module limits a quantity of fuel supplied to the engine.

14. The control module of claim 13, wherein the reduced engine power module limits an engine speed to an idle speed when the temperature of the PM filter exceeds a second predetermined temperature greater than the first predetermined temperature.

15. The control module of claim 14, wherein the reduced engine power module gradually shuts off power to the engine when the temperature of the PM filter exceeds a third predetermined temperature greater than the second predetermined temperature.

16. The control module of claim 13, wherein the reduced engine power module gradually shuts off power to the engine when the temperature of the PM filter exceeds a second predetermined temperature greater than the first predetermined temperature.

17. The control module of claim 10 wherein the reduced engine power module limits an engine speed to an idle speed.

18. The control module of claim 10, wherein the reduced engine power module gradually shuts off power to the engine.

\* \* \* \* \*